(12) United States Patent
Kiuchi (10) Patent No.: US 7,974,541 B2
(45) Date of Patent: Jul. 5, 2011

(54) HIGH FREQUENCY SIGNAL OPTICAL TRANSMISSION SYSTEM AND HIGH FREQUENCY SIGNAL OPTICAL TRANSMISSION METHOD

(75) Inventor: Hitoshi Kiuchi, Tokyo (JP)

(73) Assignee: National Institutes of Natural Sciences, Tokyo (JP)

( * ) Notice: Subject to any disclaimer, the term of this patent is extended or adjusted under 35 U.S.C. 154(b) by 604 days.

(21) Appl. No.: 12/155,420

(22) Filed: Jun. 4, 2008

(65) Prior Publication Data
US 2009/0060524 A1    Mar. 5, 2009

(30) Foreign Application Priority Data
Aug. 30, 2007    (JP) .................................. 2007-224199

(51) Int. Cl.
*H04B 10/00*    (2006.01)
(52) U.S. Cl. ........................ 398/159; 398/158; 398/161
(58) Field of Classification Search ........... 398/158–161
See application file for complete search history.

(56) References Cited

U.S. PATENT DOCUMENTS

| | | | | |
|---|---|---|---|---|
| 3,764,213 A * | 10/1973 | O'Meara | ........................ | 356/5.1 |
| 4,906,092 A * | 3/1990 | O'Meara | ...................... | 356/28.5 |
| 5,398,130 A * | 3/1995 | Redman | ........................ | 398/198 |
| 5,994,687 A * | 11/1999 | Chanteloup et al. | ........ | 250/201.9 |
| 6,634,811 B1 * | 10/2003 | Gertel et al. | ................... | 398/159 |
| 7,450,245 B2 * | 11/2008 | Woods et al. | ................. | 356/484 |

* cited by examiner

*Primary Examiner* — Agustin Bello
(74) *Attorney, Agent, or Firm* — Birch, Stewart, Kolasch & Birch, LLP

(57) ABSTRACT

A filter conducts the round trip by using the return optical signal that has been shifted in frequency, and measures the transmission optical signal and the return signal in phase by the principle of the Michelson interferometer at the same time, independently, and splits the two optical signals. A polarization state in which transmission and reception optical signals within an optical phase shifter which enters one route of the two optical signals are made orthogonal to each other is provided, to thereby distinguish the transmission and reception signals of the round trip from each other. The light is allowed to pass the shifter in incoming and returning to remove the polarization rotation of the shifter by using the reversibility of the light. Then, the phases of the transmission signal and the return signal are measured and synchronized with each other to conduct the transmission phase compensation.

4 Claims, 4 Drawing Sheets

HIGH FREQUENCY SIGNAL OPTICAL TRANSMISSION SYSTEM AND HIGH FREQUENCY SIGNAL OPTICAL TRANSMISSION METHOD

BACKGROUND OF THE INVENTION

1. Field of the Invention

The present invention relates to a high frequency signal optical transmission system and a high frequency signal optical transmission method, which optically enable a long distance transmission of a high frequency signal (SIN wave) with high stability by compensating a delay phase quantity caused by the transmission.

2. Description of the Related Art

In a long distance coaxial cable, it is impossible to transmit frequencies higher than gigahertz. On the other hand, in an optical fiber, a delay error occurs due to the polarization mode dispersion (PMD) of a light in the transmission of a high frequency signal.

In the case where a microwave signal is transmitted by means of a light, two lights different in wavelength (wavelengths $\lambda 1$ and $\lambda 2$) are used. A frequency (phase) difference between those two lights becomes a frequency of the microwave signal to be transmitted.

Figure 3A:
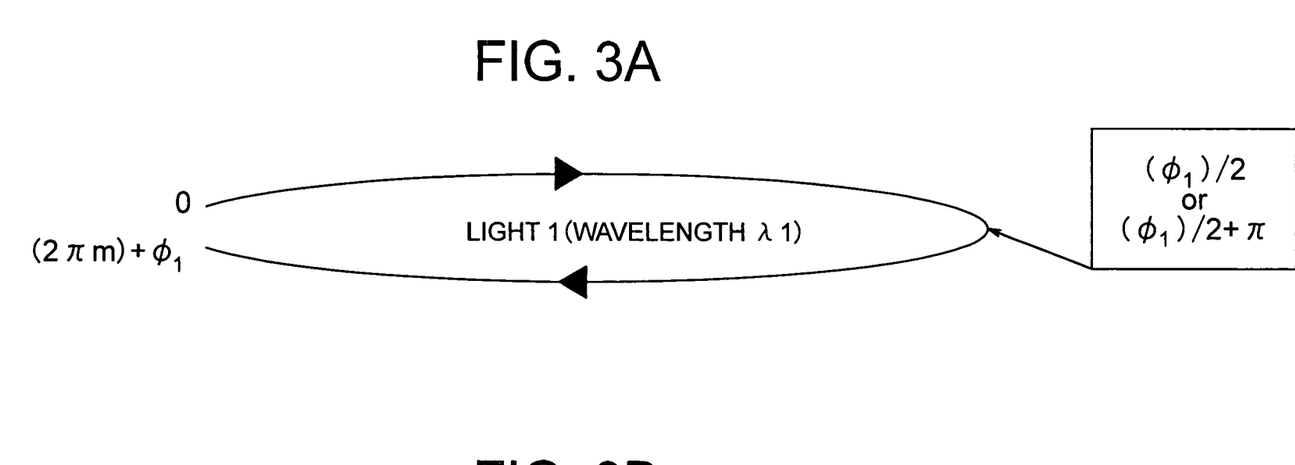
FIGS. 3A and 3B are a diagram showing two lights that are different in wavelength which conduct round trip in one optical fiber.
Figure 3B:
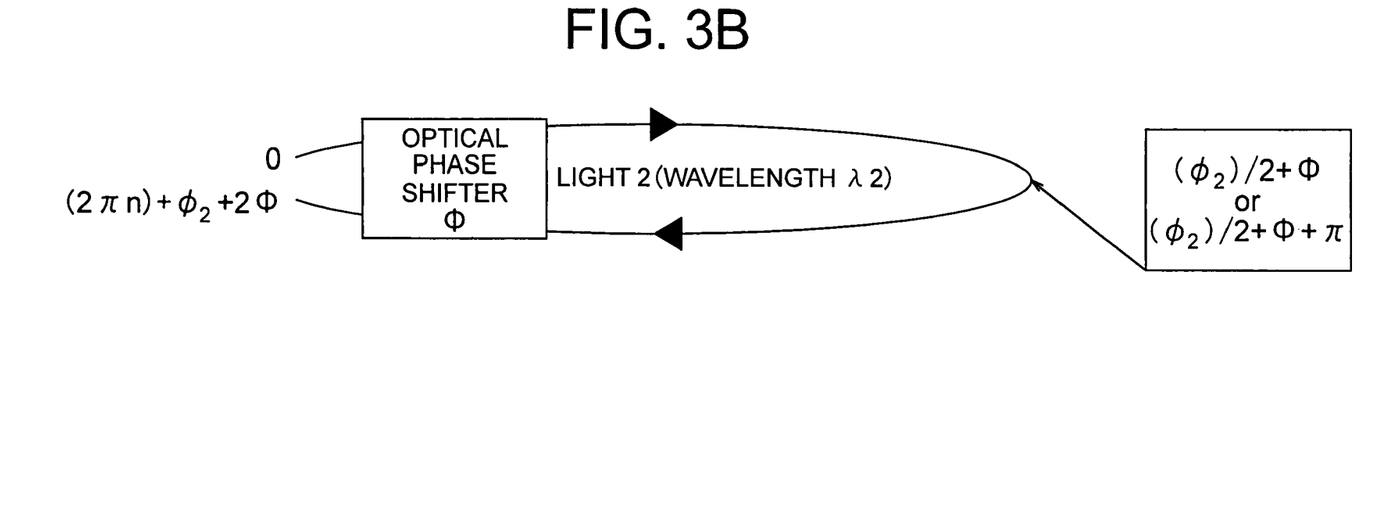

FIGS. 3A and 3B are diagrams showing two lights different in wavelength which conduct round trip in one optical fiber. Referring to FIGS. 3A and 3B, a left end is an optical transmitting end, and a right end is an optical transmitted side. In this situation, the microwave frequency to be transmitted corresponds to a difference frequency of those two lights. The difference frequency is extracted as the microwave frequency due to the action of a photodetector as a mixer at the transmitted side of the right end. As shown in FIGS. 3A and 3B, the lengths of the round trip of the two lights are different, which represents that the respective delay quantities of the two lights are different due to the polarization mode dispersion (PMD). In the optical fiber transmission, the delay quantity is different between the two lights due to the polarization mode dispersion, and the independent correction is essential.

It is assumed that the respective initial phases of the two lights (wavelengths $\lambda 1$ and $\lambda 2$) which are input from the left end of the optical fiber are 0. As shown in FIG. 3B, of those two lights, it is assumed that there is provided an optical phase shifter (phase quantity $\Phi$) for phase control in the optical wavelength $\lambda 2$. It is assumed that the phase that has been returned from the round trip in the optical wavelength $\lambda 1$ is $((2\pi m)+\phi_1)$, and the phase that has been returned from the round trip in the optical wavelength $\lambda 2$ is $((2\pi n)+\phi_2+2\Phi)$.

In this example, since a light reciprocates in one fiber, it is presumed that the transmitted side of the right end is a middle point of the round trip. In this situation, the optical phase is $(\phi_1)/2$ when m is an even, and the optical phase is $(\phi_1)/2+\pi$ when m is an odd in the optical wavelength $\lambda 1$.

Also, the optical phase is $(\phi_2)/2+\Phi$ when n is an even, and the optical phase is $(\phi_2)/2+\Phi+\pi$ when n is an odd in the optical wavelength $\lambda 2$.

When the optical phase is controlled so as to meet $\phi_1=\phi_2+2\Phi$, the phases of the two lights (wavelengths $\lambda 1$ and $\lambda 2$) are conformed to each other at the transmitted side of the right end, or different from each other just by $\pi$. Because the signal to be transmitted is transmitted as a phase difference of the two lights (wavelengths $\lambda 1$ and $\lambda 2$), the phase of the transmission signal at the transmitted side of the right end of the optical fiber having a long distance is identical with the signal phase at the transmitting end of the left end, or shifted just by $\pi$. When the optical phase is controlled to $\phi_1=\phi_2+2\Phi$, the long distance transmission of the high frequency signal is stably enabled without caring an influence of the optical fiber. In this situation, the influence given from the external during the transmission in the fiber is commonly given to the two lights (wavelengths $\lambda 1$ and $\lambda 2$), a difference between the two lights (wavelengths $\lambda 1$ and $\lambda 2$) is obtained at the transmitted side of the right end, and the influence is offset as a common noise.

In order to enable the above operation, it is necessary that a phase shifter that is inserted into only one of the two lights (wavelengths $\lambda 1$ and $\lambda 2$) is allowed to pass the light twice in total while the transmission and reception (go and return) light of the round trip is made distinct. In order to achieve the above, a structure is made to provide an optical frequency shifter, a polarization splitter, and a circulator. A polarization state in which two waves of transmission and reception are orthogonal to each other within the optical phase shifter is made for distinction. Also, in order to compensate the polarization after that light has passed the optical phase shifter, the transmission light of the optical phase shifter is reflected, and passed by reciprocation, to thereby remove the polarization rotation of the phase shifter by using the reversibility of the light.

The phase of the two lights (wavelengths $\lambda 1$ and $\lambda 2$) due to the round trip is detected by the photodetector according to the principle of a Michelson interferometer as the signal phase of the frequency twice as high as that of the optical frequency shifter at the transmitted side (right end) for splitting the transmission and reception lights. The optical phase shifter is so controlled as to meet $\phi_1=\phi_2+2\Phi$, thereby enabling the delay phase compensation.

Figure 4:
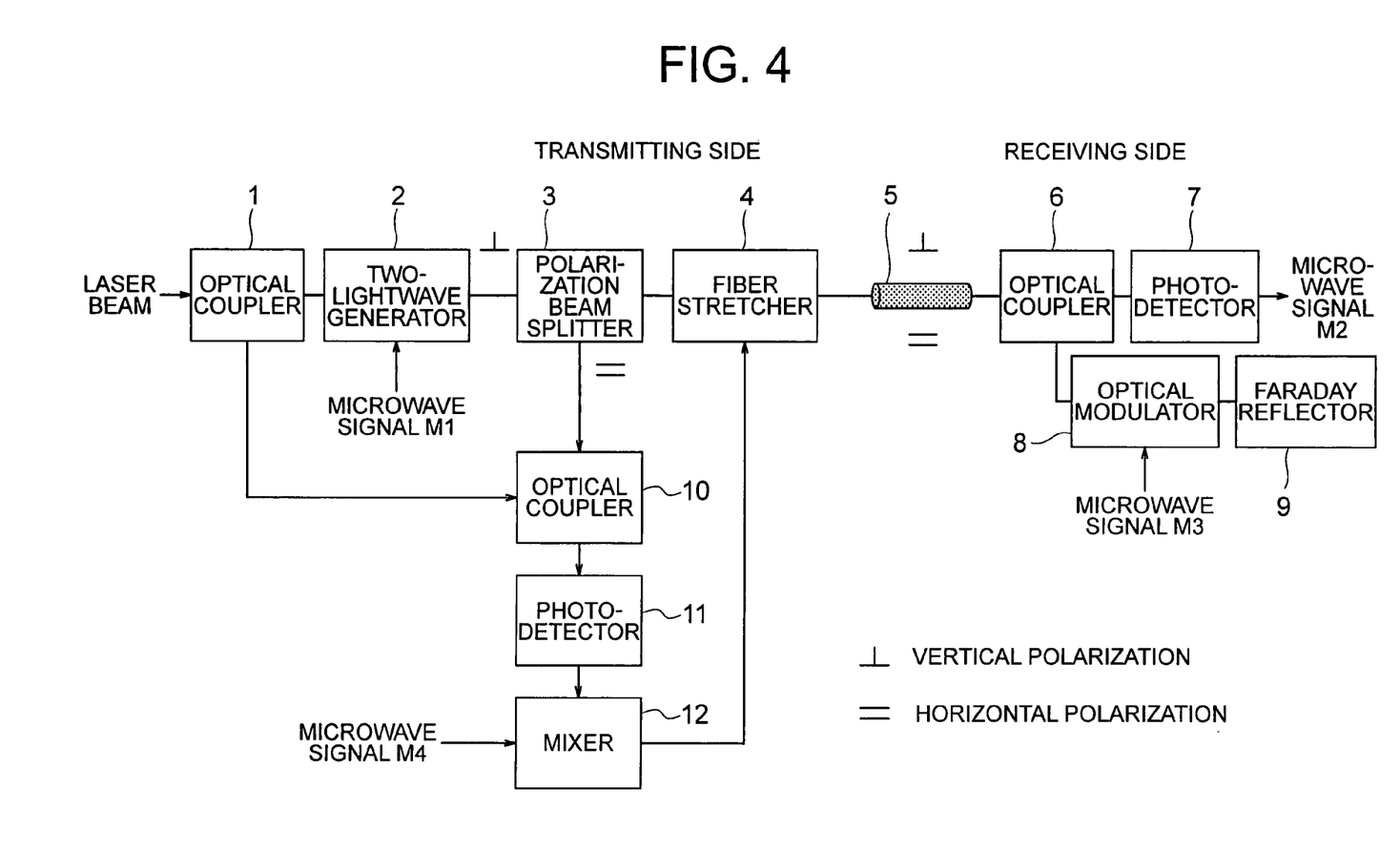
FIG. 4 is a diagram showing a configuration of a conventional high frequency signal optical transmission system.

FIG. 4 is a diagram showing the configuration of a conventional high frequency signal optical transmission system (for example, refer to J. Francois and B. Shillue, "Precision timing control for radio astronomy", IEEE control systems magazine, 19-27, February 2006). Referring to FIG. 4, the laser beam is distributed by an optical coupler 1 at the transmitting side, and two coherent optical signals that are different in the wavelength are produced from one of the laser beams by a two lightwave generator 2 by the aid of a microwave signal M1. As a result, two optical signals (wavelengths $\lambda 1$ and $\lambda 2$) which are apart from each other by the frequency of the microwave signal M1 are produced. The microwave signal M1 is a high-stable signal to be transmitted. The configuration of the two-lightwave generator 2 has the condition in which the polarizations of the two optical signals are conformed to each other.

The two optical signals are vertically polarized waves, which are guided to a polarization beam splitter 3 and pass through a fiber stretcher 4. The two optical signals are further distributed by an optical coupler 6 at the receiving side after passing through an optical fiber 5. One of the two distributed signals is guided to a photodetector 7, and output as a microwave signal M2.

After the other one of the two optical signals which has been distributed by the optical coupler 6 is frequency-shifted by the frequency of a microwave signal M3 by an optical modulator 8 as a round trip signal, and thereafter reflected by a Faraday reflector 9. Since the Faraday reflector 9 gives the Faraday rotation of 90 degrees to the light, and therefore the optical light is reflected as a light that is different in the polarization by 90 degrees.

After the reflected light of the Faraday reflector 9 has been again frequency-shifted by the frequency of the microwave signal M3 by the optical modulator 8, the reflected light passes through the optical coupler 6, the optical fiber 5, and the fiber stretcher 4, and returns to the polarization beam splitter 3. Taking the reversibility of the light into consideration, because the light that has been returned from the receiving side becomes a light different in the polarization by 90 degrees, the light becomes a horizontally polarized wave, and guided to an optical coupler 10 by the polarization beam splitter 3.

In the optical coupler 10, the remaining one of the two optical signals which has been distributed by the optical coupler 1 is mixed with the two optical signals that have been guided by the polarization beam splitter 3. The two optical signals from the polarization beam splitter 3 are different in frequency by twice of the frequency of the microwave signal M3 with respect to the optical signal from the optical coupler 1. The two optical signals that have been mixed by the optical coupler 10 are detected as the beat signal of the microwave by a photodetector 11. The beat frequency is a frequency twice as large as the microwave signal M3. The frequency is multiplied by twice of the shift frequency of a microwave signal M4 by a mixer 12, and an error signal is used for controlling the fiber stretcher 4.

The shift frequency of the microwave signal M3 is to distinguish the transmission signal from the return signal, which is a low-frequency signal. The influence of the microwave signal M3 enters the measurement result because only the phase of one optical signal is measured. For that reason, it is necessary that the microwave signal M3 and twice of the microwave signal M4 of the shift frequency are synchronized in phase with each other through some method. Also, the disturbance that has entered the optical fiber 5 during transmission enters the measurement result since only the phase of one optical signal is measured. In addition, because only the phase of one optical signal is measured, an influence of the polarization mode dispersion (PMD) cannot be removed.

In the conventional high frequency signal optical transmission system described above, since only the phase of one optical signal is measured, the influence of the microwave signal M3 enters the measurement result. Also, the disturbance of the optical fiber during transmission enters the measurement result because only the phase of one optical signal is measured. Further, since only the phase of one optical signal is measured, there arises such a problem that the influence of the polarization mode dispersion cannot be removed.

SUMMARY OF THE INVENTION

The present invention has been made to solve the above problems, and therefore an object of the present invention is to provide a high frequency signal optical transmission system and a high frequency signal optical transmission method which compensate a delay phase quantity due to the transmission, thereby enabling a long-distance optical transmission of a highly-stable high frequency signal (SIN wave).

According to the present invention, there is provided a high frequency signal optical transmission system that transmits a high frequency signal over a long distance by an optical fiber, including: two-lightwave generating means for generating an optical signal of a first wavelength and an optical signal of a second wavelength which are apart from each other by a frequency of a first microwave signal from an input laser beam by using the first microwave signal that is the high frequency signal; light distributing means for distributing two optical signals that are generated by the two-lightwave generating means; light direction converting means for changing a direction of one of the two optical signals which are distributed by the light distributing means, guiding the two optical signals including the optical signal of the second wavelength whose phase is controlled to the optical fiber, changing directions of the two optical signals that are returned from a receiving side by the optical fiber, and guiding the two optical signals including the optical signal of the second wavelength whose phase is again controlled to a direction different from the optical fiber; phase shift control means for controlling the phase of the optical signal of the second wavelength in the two optical signals to be transmitted which are guided by the light direction converting means based on a calculated phase difference to return the optical signal to the light direction converting means, and controlling the phase of the optical signal of the second wavelength in the two optical signals that are guided by the light direction converting means and returned from the receiving side to return the optical signal to the light direction converting means; receiving side processing means for detecting a difference frequency of the two optical signals that are transmitted by the optical fiber as a second microwave signal, frequency-shifting the transmitted two optical signals by a third microwave signal, and rotating polarization by 90 degrees to guide the two optical signals to the optical fiber; and phase calculating means for mixing two optical signals including the remaining one of the two optical signals which are distributed by the light distributing means and the optical signal of the second wavelength that is guided by the light direction converting means, returned from the receiving side, and again controlled in phase together, splitting the mixed signal into the optical signal of the first wavelength and the optical signal of the second wavelength, detecting a beat frequency of the microwave signals of the first wavelength and the second wavelength, and calculating a phase difference between the first microwave signal and the second microwave signal to output a calculation result to the phase shift control means.

The high frequency signal optical transmission system according to the present invention compensates a delay phase quantity due to the transmission, thereby enabling a long-distance optical transmission of a highly-stable high frequency signal (SIN wave).

DETAILED DESCRIPTION OF THE PREFERRED EMBODIMENTS

First Embodiment

Figure 1:
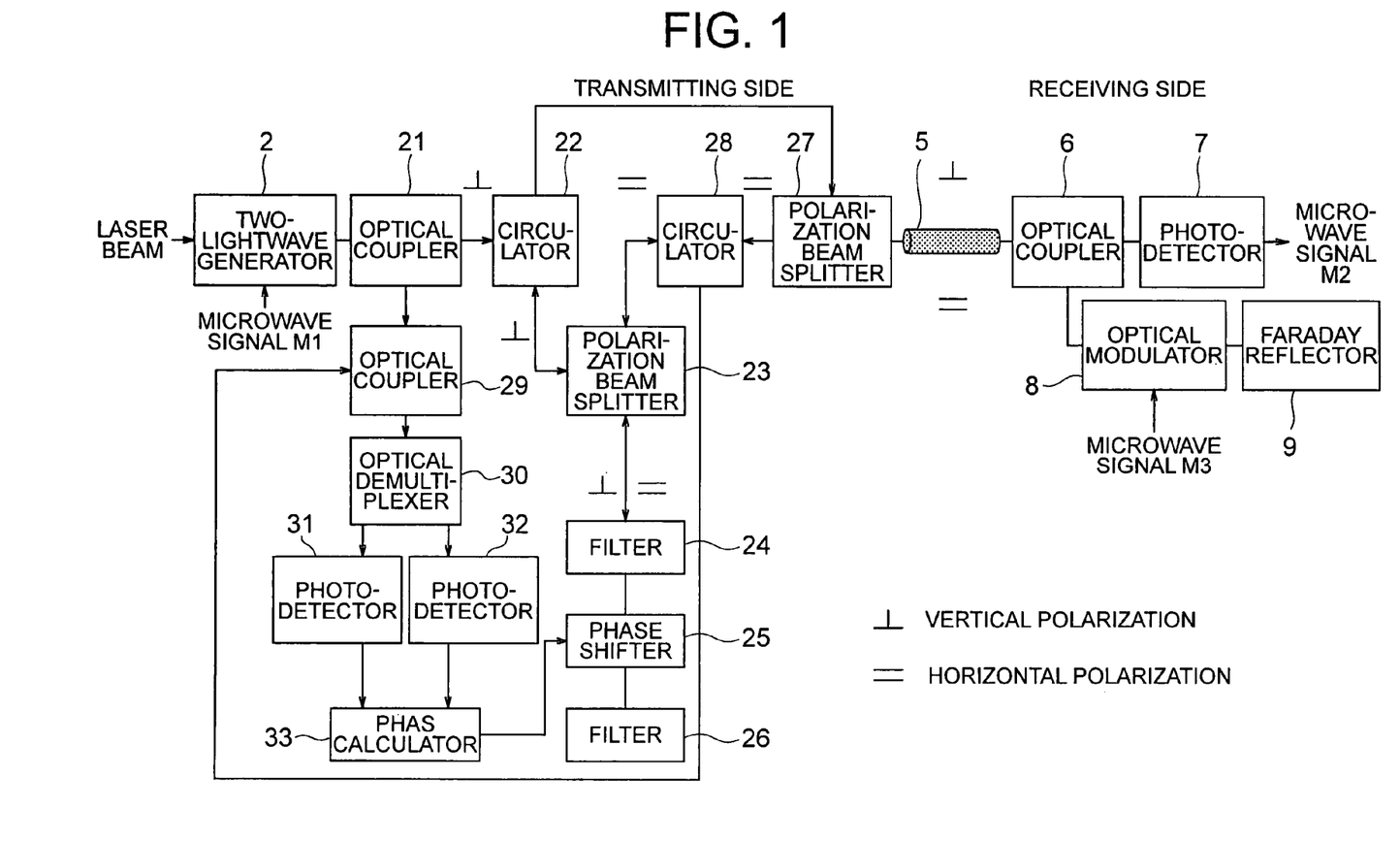
FIG. 1 is a diagram showing a configuration of a high frequency signal optical transmission system according to a first embodiment of the present invention.

A description will be given of a high frequency signal optical transmission system according to a first embodiment of the present invention with reference to FIG. 1. FIG. 1 is a diagram showing the configuration of a high frequency signal optical transmission system according to a first embodiment of the present invention. In the respective drawings, the same symbols represent identical or corresponding parts.

Referring to FIG. 1, the high frequency signal optical transmission system according to a first embodiment of the present invention includes, at a transmitting side, a two-lightwave generator (two-lightwave generating means) 2 that generates two coherent optical signals (wavelengths λ1 and λ2) which are different in wavelength from an input laser beam by using a microwave signal M1, an optical coupler (light distributing means) 21 that distributes two optical signals, and a circulator 22 that changes a direction of the optical signals. The high frequency signal optical transmission system also includes a polarization beam splitter 23 that allows the vertically polarized beam to pass between the circulator 22 and the filter 24 and allows the horizontally polarized beam to pass between the circulator 28 and the filter 24, a filter 24 that reflects an optical signal of a wavelength λ1 and allows an optical signal of a wavelength λ2 to pass, a shifter (optical phase shifter) 25 that controls the phase of the optical signal of the wavelength λ2, a filter 26 that reflects the optical signal of the wavelength λ2, a polarization beam splitter 27 that allows a vertically polarized beam to pass between the circulator 22 and the optical fiber 5 and allows the horizontally polarized beam to pass between the optical fiber 5 and the circulator 28, and the circulator 28 that changes the direction of the optical signal. The high frequency signal optical transmission system further includes an optical coupler 29 that mixes the optical signals together, an optical demultiplexer 30 that divides the optical signal in the wavelength, photodetectors 31 and 32 that detect the optical beat signal as the microwave, and a phase calculator 33 that calculates a phase difference between the microwaves that are output from the photodetectors 31 and 32, that is, calculates the phase difference between the microwave signal M1 and the microwave signal M2. Light direction converting means according to the present invention includes the circulator 22, the polarization beam splitter 23, the polarization beam splitter 27, and the circulator 28. Also, phase control means includes the filter 24, the shifter 25, and the filter 26. Further, phase calculating means includes the optical coupler 29, the optical demultiplexer 30, the photodetectors 31, 32, and the phase calculator 33.

Each of the filters 24 and 26 includes FBG (fiber brag grating) The FBG reflects the light of a certain specific wavelength, and allows other light to pass therethrough. The filter 24 reflects the optical signal of the wavelength λ2, and allows the optical signal of the wavelength λ1 to pass therethrough. The filter 26 reflects the optical signal of the wavelength λ2. That is, only the optical signal of the wavelength λ2 can be operated between the filter 24 and the filter 26. Both of those signals are returned to the original polarization by reflection. Only one optical signal which is kept coherent can be extracted by using the filter 24, the filter 26, and the polarization. Also, since the polarization is different by 90 degrees between the incoming and returning optical signals, the incoming and returning lights can be distinguished from each other. In addition, since the optical signal passes between the filter 24 and the filter 26 twice by the round-trip reciprocation, the phase shifter 25 is located between the filter 24 and the filter 26, thereby making it possible to give the same phase quantity to one optical signal at the time of incoming and returning. As a result, the optical phase shifter shown in FIG. 3B is realized. The filter 26 can be formed of a reflector.

Also, in FIG. 1, the high frequency signal optical transmission system according to the first embodiment of the present invention includes, at a receiving side, an optical coupler 6 that distributes the optical signal, a photodetector 7 (photomixer) that detects the microwave signal M2 from the two optical signals, an optical modulator 8 that frequency-shifts the optical signal by the microwave signal M3, and a Faraday reflector 9 that reflects the optical signal by rotating the polarization of the optical signal by 90 degrees. Receiving side processing means according to the present invention includes the optical coupler 6, the photodetector 7, the optical modulator 8, and the Faraday reflector 9.

In FIG. 1, the optical fiber 5 is disposed between the transmitting side and the receiving side. The optical fiber 5 is a general single mode fiber for long-distance transmission, and an optical fiber that cannot maintain the polarization can be used.

Subsequently, a description will be given of the operation of the high frequency signal optical transmission system according to the first embodiment with reference to the drawings.

The outline of the operation of the high frequency signal optical transmission system is as follows. In the high frequency signal transmission using a difference frequency of two optical signals, there is the filter 24 that conducts the round trip by using the return optical signal that has been shifted in frequency, and measures the transmission optical signal and the round trip return optical signal in phase by the principle of the Michelson interferometer at the same time, independently, and splits the two optical signals. A polarization state in which transmission/reception optical signals within the optical phase shifter 25 which enters one route of the two optical signals are made orthogonal to each other is provided, to thereby distinguish the transmission/reception optical signals of the round trip from each other. Then, the pass light of the optical phase shifter 25 is reflected in order to compensate the polarization that has passed the optical phase shifter 25. The light is allowed to pass the optical phase shifter 25 in incoming and returning to remove the polarization rotation of the optical phase shifter 25 by using the reversibility of the light. Then, the phases of the transmission optical signal and the round trip return optical signal are measured and synchronized with each other to conduct the transmission phase compensation.

The high frequency signal optical transmission system according to the first embodiment of the present invention conducts the round trip delay measurement on the two optical signals at the same time, independently, and measures the transmission delay phase due to the reciprocation of the transmission microwave signal as a difference between the transmission optical signal and the round trip return optical signal.

In the high frequency signal optical transmission system according to the first embodiment of the present invention, as shown in FIG. 1, at the receiving side, the Faraday mirror is used for the reflector 9, and the incoming and returning optical signals that pass through the optical fiber 5 are different in the polarization from each other by 90 degrees. Originally, a case in which the polarization is identical between the incoming and returning optical signals coincides with the measurement principle taking the polarization mode dispersion (PMD) into consideration. However, when the Faraday reflector 9 is used, and the polarization is rotated by 90 degrees in reciprocation, it is difficult that the optical signal is affected by the return scattering which occurs in the optical fiber 5, and the SNR is advantageous.

As shown in FIG. 1, at the transmitting side, two coherent optical signals that are different in the wavelength are generated from the input laser beam by the two-light generator 2 using the microwave signal M1. As a result, the optical signal of the wavelength λ1 and the optical signal of the wavelength λ2 which are apart from each other by the frequency of the microwave signal M1 are produced. The microwave signal M1 is a high-stable high frequency signal to be transmitted. The configuration of the two-lightwave generator 2 has the condition in which the polarizations of the two optical signals are conformed to each other. There may be a system in which a modulator such as an LN (lithium niobate) modulator, or an auxiliary laser that is synchronized with the laser beam in phase is used to produce two optical signals.

The two optical signals are vertically polarized waves, which pass through the optical coupler 21 and the circulator 22, and is thereafter guided to the polarization beam splitter 23. Further, the two optical signals are guided to the filter 24 by means of the polarization beam splitter 23, and the optical signal of the wavelength $\lambda 1$ is reflected by the filter 24, and returned to the polarization beam splitter 23.

On the other hand, the optical signal of the wavelength $\lambda 2$ passes through the filter 24, and also passes through the phase shifter 25, and thereafter is reflected by the filter 26. Thereafter, the optical signal of the wavelength $\lambda 2$ which has been reflected by the filter 26 again passes through the phase shifter 25 and the filter 24, and thereafter returns to the polarization beam splitter 23, and joins the optical signal of the wavelength $\lambda 1$.

In the sequential processings, because the reversibility of the light exists, the vertically polarized waves are maintained without changing the polarization. For that reason, the two optical signals are returned to the circulator 22 from the polarization beam splitter 23, and then guided to the polarization beam splitter 27. Then, the two optical signals of the vertically polarized waves are guided to the optical fiber 5.

The two optical signals of the vertically polarized waves are distributed by the optical coupler 6 at the receiving side after passing through the optical fiber 5. One of the distributed two optical signals is guided to the photodetector 7, and detected as the microwave signal M2. The photodetector 7 (photo-mixer) extracts the difference frequency of the two optical signals as the microwave signal M2. The microwave signal M2 is a high frequency signal that has been transmitted.

The remaining one of the two optical signals which has been distributed by the optical coupler 6 at the receiving side is frequency-shifted by the frequency of the microwave signal M3 by the optical modulator 8 as the round trip signal, and thereafter reflected by the Faraday reflector 9. Since the Faraday reflector 9 gives the Faraday rotation of 90 degrees to the light, the optical signal is reflected as the light of horizontally polarized wave that is different in the polarization by 90 degrees. The reflection light is again frequency-shifted by the frequency of the microwave signal M3 by the optical modulator 8, and thereafter the reflection light is guided to the optical coupler 6, and also guided to the optical fiber 5.

The two optical signals that pass through the optical fiber 5 from the receiving side and returns to the transmitting side are returned to the polarization beam splitter 27. Taking the reversibility of the light into consideration, because the returned two optical lights become lights different in the polarization by 90 degrees, the optical lights become the horizontally polarized waves, and guided to the circulator 28 by the polarization beam splitter 27.

The two optical signals of the horizontally polarized waves which have been guided to the polarization beam splitter 23 from the circulator 28 are further guided to the filter 24 from the polarization beam splitter 23, and the optical signal of the wavelength $\lambda 1$ is reflected by the filter 24, and returns to the polarization beam splitter 23.

On the other hand, the optical signal of the wavelength $\lambda 2$ passes through the filter 24, and also passes through the phase shifter 25, and thereafter is reflected by the filter 26. After that, the optical signal of the wavelength $\lambda 2$ which has been reflected by the filter 26 is returned to the polarization beam splitter 23 after again passing through the phase shifter 25 and the filter 24, and joins the optical signal of the wavelength $\lambda 1$.

In the sequential processings, because the reversibility of the light exists, the horizontally polarized waves are maintained without changing the polarization. For that reason, the two returned optical signals are returned to the circulator 28 from the polarization beam splitter 23, and then guided to the optical coupler 29.

In the optical coupler 29, the remaining one of the two optical signals which has been distributed by the optical coupler 21 is mixed with the two optical signals that have been guided by the circulator 28. The optical signal guided from the circulator 28 is different in the frequency from the optical signal distributed by the optical coupler 21 by twice of the frequency of the microwave signal M3.

The two optical signals that have been mixed by the optical coupler 29 are split into the optical signal of the wavelength $\lambda 1$ and the optical signal of the wavelength $\lambda 2$ by the optical demultiplexer 30, and then detected as the beat signals of the microwaves by the photodetectors 31 and 32. The beat frequency is a frequency of twice of the microwave signal M3. That is, as the output of the optical demultiplexer 30, the transmission optical signal of the wavelength $\lambda 1$ and the return optical signal of the wavelength $\lambda 1$ which is shifted in the frequency by twice of the frequency of the microwave signal M3 of the wavelength $\lambda 1$ are transmitted to the photodetector 31. Also, the transmission optical signal of the wavelength $\lambda 2$ and the return optical signal of the wavelength $\lambda 2$ which is shifted in the frequency by twice of the frequency of the microwave signal M3 are transmitted to the photodetector 32. As a result, as the outputs of the photodetectors 31 and 32, the microwave signals of the frequency twice as large as the frequency of the microwave signals M3 are obtained, respectively.

The phase calculator 33 calculates the phase difference of the transmission/reception signals on the basis of the outputs of the photodetectors 31 and 32. The two optical signals are extracted as the phase difference of the transmission/reception signals by the principle of the Michelson interferometer in the form of the microwave. The phase quantity that has been calculated by the phase calculator 33 corresponds to the cable reciprocation quantity of the optical fiber 5 or the like. That is, because the obtained phase is affected by the reciprocation quantity of a delay for allowing the optical signal to pass through the optical fiber 5 or the like, the phase becomes twice of the phase difference between the microwave signal M1 and the microwave signal M2. For that reason, the quantity of the half of the phase that has been obtained by the phase calculator 33 is obtained as the additional phase caused by the delay of the optical fiber 5 or the like. When the phase shifter 25 is controlled so that the respective phases detected by the photodetectors 31 and 32 are identical with each other, the phase of the microwave signal M2 at the receiving side is synchronized with the phase of the microwave signal M1 at the transmitting side.

The microwave signal M3 is to distinguish the transmission optical signal and the return optical signal, which is a low-frequency signal. The influence of the microwave signal M3 and the disturbance that enters the optical fiber 5 during transmission can be dealt with as the common mode noise because the noises enter the two optical signals at the same time, and are eliminated when the phase angle is calculated as a difference of the outputs of the photodetectors 31 and 32. That is, the quantity that is obtained by the phase calculator 33 is not affected by the disturbance.

In the high frequency signal optical transmission system according to the first embodiment, the optical coupler 21, the circulator 22, the polarization beam splitter 23, the polarization splitter 27, the circulator 28, and the optical coupler 29 are coupled with each other by the polarization maintaining fiber. The polarization maintaining fiber is extremely shorter than the optical fiber 5.

Second Embodiment

Figure 2:
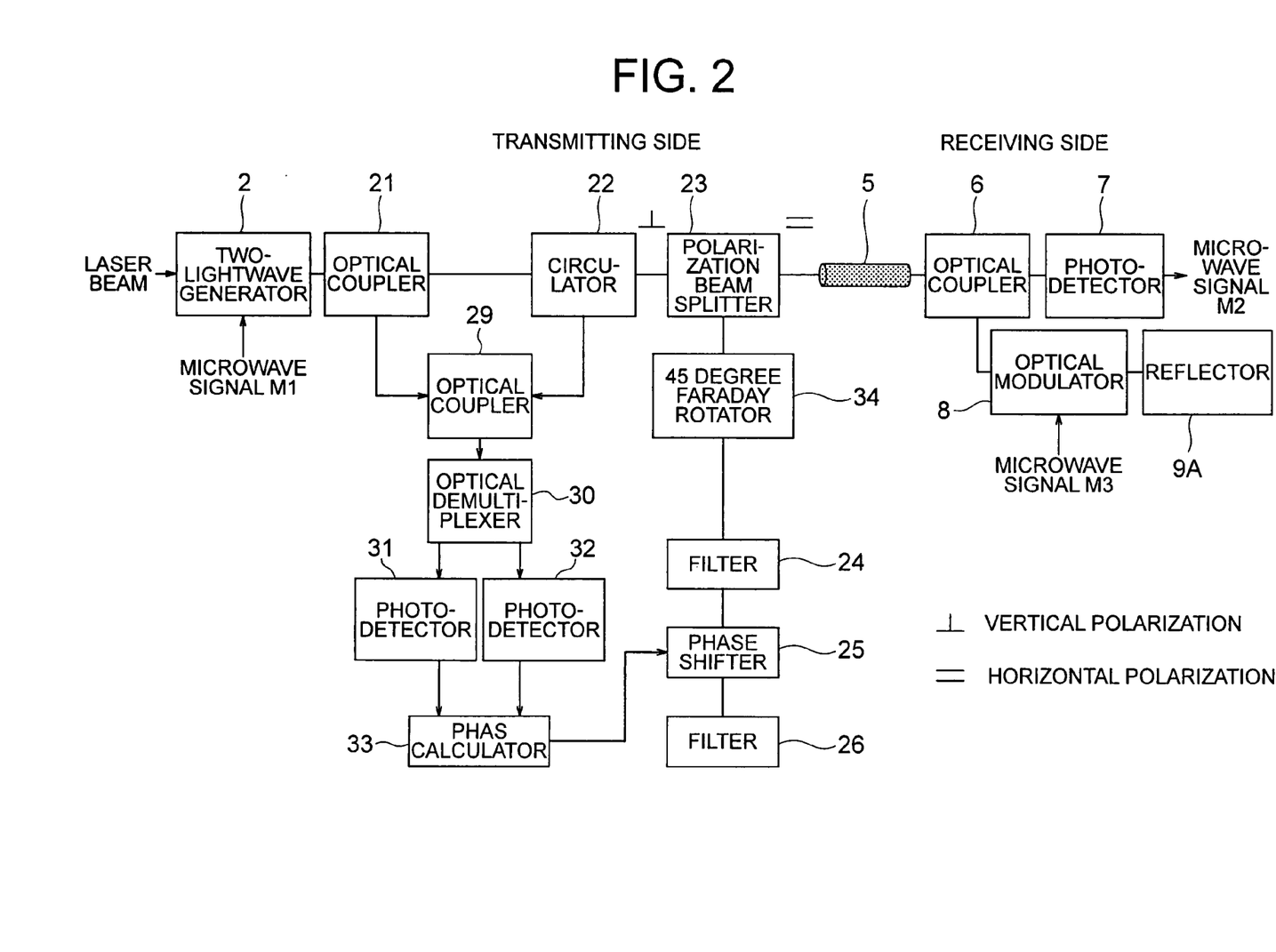
FIG. 2 is a diagram showing a configuration of a high frequency signal optical transmission system according to a second embodiment of the present invention.

A description will be given of a high frequency signal optical transmission system according to a second embodiment of the present invention with reference to FIG. 2. FIG. 2 is a diagram showing the configuration of a high frequency signal optical transmission system according to the second embodiment of the present invention.

Referring to FIG. 2, the high frequency signal optical transmission system according to the second embodiment of the present invention includes, at a transmitting side, a two-lightwave generator (two-lightwave generating means) 2 that generates two coherent optical signals (wavelengths $\lambda 1$ and $\lambda 2$) which are different in wavelength from an input laser beam by using a microwave signal M1, an optical coupler (light distributing means) 21 that distributes two optical signals, and a circulator 22 that changes a direction of the optical signal. The high frequency signal optical transmission system also includes a polarization beam splitter 23 that allows the vertically polarized beam to pass between the circulator 22 and a 45 degree Faraday rotator and allows the horizontally polarized beam to pass between the optical fiber and the 45 degree Faraday rotator 34, the 45 degree Faraday rotator 34 that conducts the polarization rotation of 45 degrees, a filter 24 that reflects an optical signal of a wavelength $\lambda 1$ and allows an optical signal of a wavelength $\lambda 2$ to pass, a phase shifter (optical phase shifter) 25 that controls the phase of the optical signal of the wavelength $\lambda 2$, and a filter 26 that reflects the optical signal of the wavelength $\lambda 2$. The high frequency signal optical transmission system further includes an optical coupler 29 that mixes the optical signals together, an optical demultiplexer 30 that divides the optical beat signal in the wavelength, photodetectors 31 and 32 that detect the optical beat signal as the microwave, and a phase calculator 33 that calculates a phase difference between the microwaves that are output from the photodetectors 31 and 32, that is, calculates the phase difference between the microwave signal M1 and the microwave signal M2. The light direction converting means according to the present invention includes the circulator 22 and the polarization beam splitter 23. In addition, the phase control means includes the 45 degree Faraday rotator 34, the filter 24, the phase shifter 25, and the filter 26. Further, the phase calculating means includes the optical coupler 29, the optical demultiplexer 30, the photo detectors 31, 32, and the phase calculator 33.

Each of the filters 24 and 26 includes FBG (fiber brag grating). The FBG reflects the optical signal of a certain specific wavelength, and allows other optical signal to pass therethrough. The filter 24 reflects the optical signal of the wavelength $\lambda 1$, and allows the optical signal of the wavelength $\lambda 2$ to pass therethrough. The filter 26 reflects the optical signal of the wavelength $\lambda 2$. That is, only the optical signal of the wavelength $\lambda 2$ can be operated between the filter 24 and the filter 26. Both of those signals are returned to the original polarization by reflection. Only one optical signal which is kept coherent can be extracted by using the filter 24, the filter 26, and the polarization. Also, since the polarization is different by 90 degrees between the incoming and returning optical signals, the incoming and returning lights can be distinguished from each other. In addition, since the optical signal passes between the filter 24 and the filter 26 twice by the round-trip reciprocation, the phase shifter 25 is located between the filter 24 and the filter 26, thereby making it possible to give the same phase quantity to one optical signal at the time of incoming and returning. As a result, the optical phase shifter shown in FIG. 3B is realized. The filter 26 can be formed of a reflector.

Also, in FIG. 2, the high frequency signal optical transmission system according to the second embodiment of the present invention includes, at a receiving side, an optical coupler 6 that distributes the optical signal, a photodetector 7 (photo-mixer) that detects the microwave signal M2 from the two optical signals, an optical modulator 8 that frequency-shifts the optical signal by the microwave signal M3, and a reflector 9A that reflects the optical signal. The receiving side processing means according to the present invention includes the optical coupler 6, the photodetector 7, the optical modulator 8, and the reflector 9A.

In FIG. 2, the optical fiber 5 is disposed between the transmitting side and the receiving side. The optical fiber 5 is a general single mode fiber for long-distance transmission, and an optical fiber that cannot maintain the polarization can be used.

Subsequently, a description will be given of the operation of the high frequency signal optical transmission system according to the second embodiment with reference to the drawings.

The operation of the high frequency signal optical transmission system according to the second embodiment of the present invention conducts the round trip delay measurement on the two optical signals at the same time, independently, and measures the transmission delay phase due to the reciprocation of the transmission microwave signal as a difference between the two optical signals.

As shown in FIG. 2, the high frequency signal optical transmission system according to the second embodiment of the present invention uses a normal mirror as the reflector 9A at the receiving side, and allows the polarization of the optical signal that passes through the optical fiber 5 to coincide with each other by reciprocation. Therefore, this is a manner that coincides with the measurement principle.

As shown in FIG. 2, at the transmitting side, the two-lightwave generator 2 generates the two coherent optical signals that are different in the wavelength from the input laser beam by the aid of the microwave signal M1. As a result, the optical signal of the wavelength $\lambda 1$ and the optical signal of the wavelength $\lambda 2$ which are apart from each other by the frequency of the microwave signal M1 are produced. The microwave signal M1 is a high-stable high frequency signal to be transmitted. The configuration of the two-lightwave generator 2 has the condition in which the polarizations of the two optical signals are conformed to each other. There may be a system in which a modulator such as an LN (lithium niobate) modulator, or an auxiliary laser that is synchronized with the laser beam in phase is used to produce two optical signals.

The two optical signals are vertically polarized waves, which pass through the optical coupler 21 and the circulator 22, and is thereafter guided to the polarization beam splitter 23. After that, the two optical signals are guided to the 45 degree Faraday rotator 34 by the polarization beam splitter 23. In the 45 degree Faraday rotator 34, the polarization rotation of 45 degrees is conducted. Further, the two optical signals are guided to the filter 24, and the optical signal of the wavelength $\lambda 1$ is reflected by the filter 24, polarization-rotated by the 45 degree Faraday rotator 34, and returned to the polarization beam splitter 23. The total of the polarization rotation is 90 degree, which produces the horizontally polarized wave that is orthogonal to the vertically polarized wave at the time of entering the polarization beam splitter 23.

On the other hand, the optical signal of the wavelength λ2 passes through the filter 24, and also passes through the phase shifter 25, and thereafter is reflected by the filter 26. After that, the optical signal of the wavelength λ2 which has been reflected by the filter 26 again passes through the phase shifter 25, the filter 24, and the 45 degree Faraday rotator 34, and thereafter returns to the polarization beam splitter 23, and joins the optical signal of the wavelength λ1. The total of the polarization rotation is 90 degree, which produces the horizontally polarized wave that is orthogonal to the vertically polarized wave at the time of entering the polarization beam splitter 23. For that reason, the horizontally polarized beam is guided to the optical fiber 5 from the polarization beam splitter 23.

The two optical signals of the horizontally polarized waves are distributed by the optical coupler 6 at the receiving side after passing through the optical fiber 5. One of those two optical signals distributed is guided to the photodetector 7, and detected as the microwave signal M2. The photodetector 7 (photo-mixer) extracts the difference frequency of the two optical signals as the microwave signal M2. The microwave signal M2 is a high frequency signal that has been transmitted.

The remaining one of the two optical signals which has been distributed by the optical coupler 6 at the receiving side is frequency-shifted by the frequency of the microwave signal M3 by the optical modulator 8 as the round trip signal, and thereafter reflected by the reflector 9A. The reflection light is again frequency-shifted by the frequency of the microwave signal M3 by the optical modulator 8, and thereafter the reflection light is guided to the optical coupler 6, and also guided to the optical fiber 5.

The two optical signals that pass through the optical fiber 5 from the receiving side and return to the transmitting side are returned to the polarization beam splitter 23. Taking the reversibility of the light into consideration, the returned two optical lights are the horizontally polarized waves, and guided to the 45 degree Faraday rotator 34 by the polarization beam splitter 23. The 45 degree Faraday rotator 34 conducts the polarization rotation. In addition, the two optical signals are guided to the filter 24, and the optical signal of the wavelength λ1 is reflected by the filter 24, again polarization-rotated by the 45 degree Faraday rotator 34, and returns to the polarization beam splitter 23. The total of the polarization rotation is 90 degree, which produces the vertically polarized wave that is orthogonal to the horizontally polarized wave at the time of entering the polarization beam splitter 23.

On the other hand, the optical signal of the wavelength λ2 passes through the filter 24, and also passes through the phase shifter 25, and thereafter is reflected by the filter 26. After that, the optical signal of the wavelength λ2 which has been reflected by the filter 26 again passes through the phase shifter 25, the filter 24, and the 45 degree Faraday rotator 34, and thereafter returns to the polarization beam splitter 23, and joins the optical signal of the wavelength λ1. The total of the polarization rotation is 90 degree, which produces the vertically polarized wave that is orthogonal to the horizontally polarized wave at the time of entering the polarization beam splitter 23. For that reason, the vertically polarized beam is returned to the circulator 22 from the polarization beam splitter 23, and then guided to the optical coupler 29.

In the optical coupler 29, the remaining one of the two optical signals which has been distributed by the optical coupler 21 is mixed with the two optical signals that have been guided by the circulator 22. The optical signal guided from the circulator 22 is different in the frequency from the optical signal distributed by the optical coupler 21 by twice of the frequency of the microwave signal M3.

The two optical signals that have been mixed by the optical coupler 29 are split into the optical signal of the wavelength λ1 and the optical signal of the wavelength λ2 by the optical demultiplexer 30, and then detected as the beat signals of the microwaves by the photodetectors 31 and 32. The beat frequency is a frequency of twice of the microwave signal M3. That is, as the output of the optical demultiplexer 30, the transmission optical signal of the wavelength λ1 and the return optical signal of the wavelength λ1 which is shifted in the frequency by twice of the frequency of the microwave signal M3 of the wavelength λ1 are transmitted to the photodetector 31. Also, the transmission optical signal of the wavelength λ2 and the return optical signal of the wavelength λ2 which is shifted in the frequency by twice of the frequency of the microwave signal M3 are transmitted to the photodetector 32. As a result, as the outputs of the photodetectors 31 and 32, the microwave signals of the frequency twice as large as the frequency of the microwave signals M3 are obtained, respectively.

The phase calculator 33 calculates the phase difference of the transmission/reception signals on the basis of the outputs of the photodetectors 31 and 32. The two optical signals are extracted as the phase difference of the transmission/reception signals by the principle of the Michelson interferometer in the form of the microwave. The phase quantity that has been calculated by the phase calculator 33 corresponds to the cable reciprocation quantity of the optical fiber 5 or the like. That is, because the obtained phase is affected by the reciprocation quantity of a delay for allowing the optical signal to pass through the optical fiber 5 or the like, the phase becomes twice of the phase difference between the microwave signal M1 and the microwave signal M2. For that reason, the quantity of the half of the phase that has been obtained by the phase calculator 33 is obtained as the additional phase caused by the delay of the optical fiber 5 or the like. When the phase shifter 25 is controlled so that the respective phases detected by the photodetectors 31 and 32 are identical with each other, the phase of the microwave signal M2 at the receiving side is synchronized with the phase of the microwave signal M1 at the transmitting side.

The 45 degree Faraday rotator 34 can be replaced with a three port circulator (when input terminals are A, B, and C, a circulator that can circulates from A to B, from B to C, and from C to A), and a Faraday reflector (90 degree polarization rotation).

The microwave signal M3 is to distinguish the transmission optical signal and the return optical signal, which is a low-frequency signal. The influence of the microwave signal M3 and the disturbance that enters the optical fiber 5 during transmission can be dealt with as the common mode noise because the noises enter the two optical signals at the same time, and are eliminated when the phase angle is calculated as a difference of the outputs of the photodetectors 31 and 32. That is, the quantity that is obtained by the phase calculator 33 is not affected by the disturbance.

In the high frequency signal optical transmission system according to the second embodiment, the optical coupler 21, the circulator 22, the polarization beam splitter 23, and the optical coupler 29 are coupled with each other by the polarization maintaining fiber. The polarization maintaining fiber is extremely shorter than the optical fiber 5.

The respective embodiments described above can be applied to a signal transmission field in which there are the objects regarding the high stability of the reference signal transmission such as an interferometer, or the transmission or distribution of the high stable signal such as the national frequency standard, or applied to the field in which there is a problem on the transmission delay.

What is claimed is:

1. A high frequency signal optical transmission system that transmits a high frequency signal over a long distance by an optical fiber, comprising:

two-lightwave generating means for generating an optical signal of a first wavelength and an optical signal of a second wavelength which are apart from each other by a frequency of a first microwave signal from an input laser beam by using the first microwave signal that is the high frequency signal;

light distributing means for distributing two optical signals that are generated by the two-lightwave generating means;

light direction converting means for changing a direction of one of the two optical signals which are distributed by the light distributing means, guiding the two optical signals including the optical signal of the second wavelength whose phase is controlled to the optical fiber, changing directions of the two optical signals that are returned from a receiving side by the optical fiber, and guiding the two optical signals including the optical signal of the second wavelength whose phase is again controlled to a direction different from the optical fiber;

phase shift control means for controlling the phase of the optical signal of the second wavelength in the two optical signals to be transmitted which are guided by the light direction converting means based on a calculated phase difference to return the optical signal to the light direction converting means, and controlling the phase of the optical signal of the second wavelength in the two optical signals that are guided by the light direction converting means and returned from the receiving side to return the optical signal to the light direction converting means;

receiving side processing means for detecting a difference frequency of the two optical signals that are transmitted by the optical fiber as a second microwave signal, frequency-shifting the transmitted two optical signals by a third microwave signal, and rotating polarization by 90 degrees to guide the two optical signals to the optical fiber; and phase calculating means for mixing two optical signals including the remaining one of the two optical signals which are distributed by the light distributing means and the optical signal of the second wavelength that is guided by the light direction converting means, returned from the receiving side, and again controlled in phase together, splitting the mixed signal into the optical signal of the first wavelength and the optical signal of the second wavelength, detecting a beat frequency of the microwave signals of the first wavelength and the second wavelength, and calculating a phase difference between the first microwave signal and the second microwave signal to output a calculation result to the phase shift control means.

2. A high frequency signal optical transmission method that transmits a high frequency signal over a long distance by an optical fiber, comprising:

a two-lightwave generating step of generating an optical signal of a first wavelength and an optical signal of a second wavelength which are apart from each other by a frequency of a first microwave signal from an input laser beam by using the first microwave signal that is the high frequency signal by two-lightwave generating means;

a light distributing step of distributing two optical signals that are generated by the two-lightwave generating means by light distributing means;

a first light direction converting step of changing a direction of one of the two optical signals which are distributed by the light distributing means by light direction converting means;

a first phase shift control step of controlling a phase of the optical signal of the second wavelength in the two optical signals to be transmitted which are guided by the light direction converting means based on a calculated phase difference to return the optical signal to the light direction converting means by phase shift control means;

a second light direction converting step of guiding the two optical signals including the optical signal of the second wavelength whose phase is controlled to the optical fiber by the light direction converting means;

a receiving side processing step of detecting a difference frequency of the transmitted two optical signals that are by the optical fiber as a second microwave signal, frequency-shifting the transmitted two optical signals by a third microwave signal, and rotating polarization by 90 degrees to guide the two optical signals to the optical fiber by receiving side processing means;

a third light direction converting step of changing directions of the two optical signals that are returned from a receiving side by the optical fiber by the light direction converting means;

a second phase shift control step of controlling the phase of the optical signal of the second wavelength in the two optical signals which are guided by the light direction converting means and returned from the receiving side based on the calculated phase difference, and returning the optical signal to the light direction converting means by the phase shift control means;

a fourth light direction converting step of guiding the two optical signals including the optical signal of the second wavelength whose phase is again controlled in a direction different from the optical fiber by the light direction converting means; and a phase calculating step of mixing two optical signals including the remaining one of the two optical signals which are distributed by the light distributing means and the optical signal of the second wavelength that is guided by the light direction converting means, returned from the receiving side, and again controlled in phase together, splitting the mixed signal into the optical signal of the first wavelength and the optical signal of the second wavelength, detecting a beat frequency of the microwave signals of the first wavelength and the second wavelength, and calculating a phase difference between the first microwave signal and the second microwave signal to output a calculation result to the phase shift control means by phase calculating means.

3. A high frequency signal optical transmission system that transmits a high frequency signal over a long distance by an optical fiber, comprising:

two-lightwave generating means for generating an optical signal of a first wavelength and an optical signal of a second wavelength which are apart from each other by a frequency of a first microwave signal from an input laser beam by using the first microwave signal that is the high frequency signal;

light distributing means for distributing two optical signals that are generated by the two-lightwave generating means;

light direction converting means for changing a direction of one of the two optical signals which are distributed by the light distributing means, guiding the two optical signals including the optical signal of the second wavelength whose phase is controlled to the optical fiber, changing directions of the two optical signals that are returned from a receiving side by the optical fiber, and guiding the two optical signals including the optical signal of the second wavelength whose phase is again controlled to a direction different from the optical fiber;

phase shift control means for controlling the phase of the optical signal of the second wavelength in the two optical signals to be transmitted which are guided by the light direction converting means based on a calculated phase difference, rotating polarization by 90 degrees to return the optical signal to the light direction converting means, controlling the phase of the optical signal of the second wavelength in the two optical signals that are guided by the light direction converting means and returned from the receiving side, and rotating the polarization by 90 degrees to return the optical signal to the light direction converting means;

receiving side processing means for detecting a difference frequency of the two optical signals that are transmitted by the optical fiber as a second microwave signal, and frequency-shifting the transmitted two optical signals by a third microwave signal to guide the two optical signals to the optical fiber; and phase calculating means for mixing two optical signals including the remaining one of the two optical signals which are distributed by the light distributing means and the optical signal of the second wavelength that is guided by the light direction converting means, returned from the receiving side, and again controlled in phase together, splitting the mixed signal into the optical signal of the first wavelength and the optical signal of the second wavelength, detecting a beat frequency of the microwave signals of the first wavelength and the second wavelength, and calculating a phase difference between the first microwave signal and the second microwave signal to output a calculation result to the phase shift control means.

4. A high frequency signal optical transmission method that transmits a high frequency signal over a long distance by an optical fiber, comprising:

a two-light wave generating step of generating an optical signal of a first wavelength and an optical signal of a second wavelength which are apart from each other by a frequency of a first microwave signal from an input laser beam by using the first microwave signal that is the high frequency signal by two-lightwave generating means;

a light distributing step of distributing two optical signals that are generated by the two-lightwave generating means by light distributing means;

a first light direction converting step of changing a direction of one of the two optical signals which are distributed by the light distributing means by light direction converting means;

a first phase shift control step of controlling a phase of the optical signal of the second wavelength in the two optical signals to be transmitted which are guided by the light direction converting means based on a calculated phase difference, rotating polarization by 90 degrees to return the optical signal to the light direction converting means by phase shift control means;

a second light direction converting step of guiding the two optical signals including the optical signal of the second wavelength whose phase is controlled to the optical fiber by the light direction converting means;

a receiving side processing step of detecting a difference frequency of the transmitted two optical signals that are by the optical fiber as a second microwave signal, and frequency-shifting the transmitted two optical signals by a third microwave signal to guide the two optical signals to the optical fiber by receiving side processing means;

a third light direction converting step of changing directions of the two optical signals that are returned from a receiving side by the optical fiber by the light direction converting means;

a second phase shift control step of controlling the phase of the optical signal of the second wavelength in the two optical signals which are guided by the light direction converting means and returned from the receiving side based on the calculated phase difference, and rotating polarization by 90 degrees to return the optical signal to the light direction converting means by the phase shift control means;

a fourth light direction converting step of guiding the two optical signals including the optical signal of the second wavelength whose phase is again controlled in a direction different from the optical fiber by the light direction converting means; and a phase calculating step of mixing two optical signals including the remaining one of the two optical signals which are distributed by the light distributing means and the optical signal of the second wavelength that is guided by the light direction converting means, returned from the receiving side, and again controlled in phase together, splitting the mixed signal into the optical signal of the first wavelength and the optical signal of the second wavelength, detecting a beat frequency of the microwave signals of the first wavelength and the second wavelength, and calculating a phase difference between the first microwave signal and the second microwave signal to output a calculation result to the phase shift control means by phase calculating means.

* * * * *